Patented Sept. 22, 1925.

1,554,642

UNITED STATES PATENT OFFICE.

CARL S. MINER, OF CHICAGO, ILLINOIS, ASSIGNOR TO THE QUAKER OATS COMPANY, OF CHICAGO, ILLINOIS, A CORPORATION OF NEW JERSEY.

GERMICIDAL AGENT AND PROCESS FOR PRESERVING ORGANIC MATERIALS.

No Drawing. Application filed April 16, 1923. Serial No. 632,530.

*To all whom it may concern:*

Be it known that I, CARL S. MINER, a citizen of the United States, residing at Chicago, in the county of Cook and State of Illinois, have invented new and useful Improvements in Germicidal Agents and Processes for Preserving Organic Materials, of which the following is a full, clear, concise, and exact description.

My invention relates to preservatives for organic materials and also to an improved process whereby organic materials may be preserved.

Each of the common preserving agents as heretofore employed has only a limited field wherein it may be advantageously used, and for many purposes especially in connection with certain particular products no satisfactory preservative has heretofore been known and available.

No single efficient preservative agent has been available for general purposes because of inherent disadvantages accompanying their use with many substances. Among the well known preservatives may be included—phenol which is toxic and has an offensive odor—mercuric chloride which is also toxic and very inefficient in the presence of proteid bodies—and sulfurous and boric acids which have an efficiency relatively low and therefore unsuitable for many purposes.

Formaldehyde has been very commonly employed as a preservative and while it serves with a reasonable degree of efficiency in some instances, molds have been found to grow readily in its presence even in high concentrations. Formaldehyde is furthermore poisonous, has an offensive odor and is highly volatile.

An object of my invention, therefore, is to provide a preservative or germicidal agent for use with organic materials which will be devoid of the aforementioned defects accompanying the use of the previously available preservatives.

Another object of my invention is to provide a process of preservng substances which shall be free from the disadvantages heretofore encountered in such processes.

Furthermore, the objects of my invention include the provision of a preservative for organic materials and germicidal agent which is odorless, free from any unpleasant taste, colorless, soluble, non-toxic, non-volatile, free from any tendency to react with the constituents of the materials treated, and efficient as a preservative against both molds and bacteria, and which shall at the same time be economical of production.

I have discovered that pyromucic acid, which I prefer to term "furoic acid," is an ideal preservative substance for practically all uses. This material occurs in a white crystalline form possessing no odor even when heated and possessing only a pleasant, slightly acid taste. It is soluble in both water and alcohol. It is excreted unchanged from the human body.

I have found "furoic acid" to be highly effective in inhibiting the growth of both molds and bacteria even in the presence of large percentages of protein matter, such as is found in glue liquors and the like. Its efficiency is maintained for this purpose even when used in concentrations as low as 0.1%. "Furoic acid" is non-volatile and is not melted until raised to a temperature of approximately 130° C. It is very resistant to decomposition, and very high temperatures are necessary to effect a breaking up of its chemical structure, and as a consequence its preservative action persists unchanged in strength over long periods of time.

It will be apparent that the above described properties are such that pyromucic or "furoic acid" is a very desirable preservative for general purposes and that its use is not limited to particular fields as has been the use of most substances for this purpose heretofore known.

Furoic acid is especially useful as a preservative for preventing the decomposition of organic products containing amounts of water sufficient to render them readily subject to decomposition. Liquid adhesives prepared from glue, starch or dextrin are typical commercial products of this character and may be readily preserved over long periods of time by the addition of as little as 0.1% of furoic acid.

In practicing my process the furoic acid may be dissolved in the water which is to be used in producing liquid glue, starch, dextrin paste or other material, or it may be dissolved in a small amount of alcohol (in which it is extremely soluble) and which then may be introduced into the thoroughly mixed with the finished product. It may also be used in similar fashion for the preservation of toilet preparations, such as creams, lotions and the like which are frequently rendered unmerchantable by the development of mold during their shipment or storage.

It is not intended that this invention be limited by the above specific description, but it is to be understood that I am to be limited only by the following claims forming a part of this present application.

Having thus described my invention, what I claim as new and desire to secure by Letters Patent in the United States is:—

1. The process of preserving organic material which comprises treating the material with a preservative comprising pyromucic acid.

2. The process of preserving organic material which consists in thoroughly mixing therewith pyromucic acid in dissolved state.

3. The process of preserving organic materials which consists in thoroughly mixing therewith less than 1 per cent of pyromucic acid in dissolved state.

4. A preservative for organic material comprising pyromucic acid.

In witness whereof, I have hereunto subscribed my name.

CARL S. MINER.